United States Patent [19]

Lacoste

[11] Patent Number: 5,755,105
[45] Date of Patent: May 26, 1998

[54] AIR CONDITIONING SYSTEM FLUID LEVEL CONTROLLER

[76] Inventor: Marvin Lacoste, P.O. Box 292, Kiln, Miss. 39556

[21] Appl. No.: 803,388

[22] Filed: Feb. 20, 1997

Related U.S. Application Data

[60] Provisional application No. 60/011,962 Feb. 20, 1996.
[51] Int. Cl.$^6$ .................................................. F25B 49/02
[52] U.S. Cl. ............................... 62/129; 62/188; 340/620
[58] Field of Search ........................... 62/126, 125, 127, 62/128, 129, 188; 340/616, 618, 620

[56] References Cited

U.S. PATENT DOCUMENTS

| | | |
|---|---|---|
| 4,633,673 | 1/1987 | Morrison et al. ............... 62/129 |
| 4,787,212 | 11/1988 | Hessey ............................ 62/188 |
| 4,937,559 | 6/1990 | Meacham et al. ............. 340/618 |
| 5,522,229 | 6/1996 | Stuchlik, III et al. ....... 340/620 X |

*Primary Examiner*—Harry B. Tanner
*Attorney, Agent, or Firm*—Pravel, Hewitt, Kimball & Krieger

[57] ABSTRACT

A sensor apparatus, which is threadably engaged into the auxiliary drain orifice in the drain pan. The sensor includes a pair of water contact points on a first end, which is on the threaded end of the sensor, so that should fluid or water make contact with the points, it effects a bridge across the points for creating a circuit there across. Upon this occurring, the electrical components contained within the sensor would relay a message through the thermostat wire, to the air conditioning system which would automatically shut the system down. Likewise, there is on the second end of the sensor a fluid high level indicator light, which would glow when this eventuality occurs. Therefore, when the owner would attempt to restart the system, the system would not reactivate. Therefore, upon inspection of the coils, etc., one could see that the glowing light would mean that there is a water level in the pan which is unacceptable, and therefore the water level would have to be lowered or the pan drained to a point that the is water contacts on the threaded end of the sensor would not be bridged, and therefore the system could return to use.

12 Claims, 3 Drawing Sheets

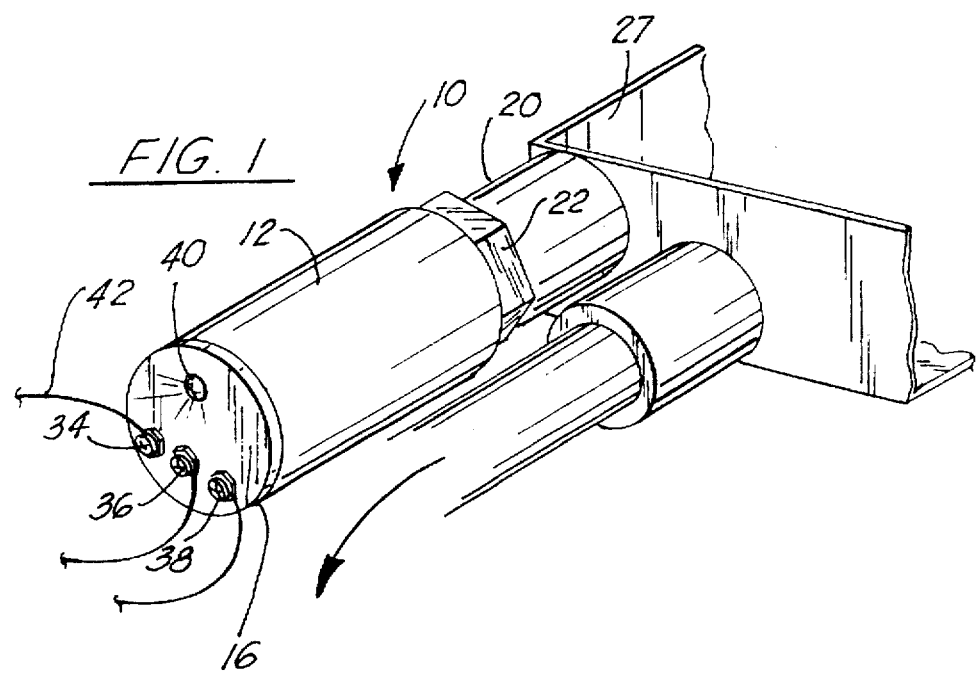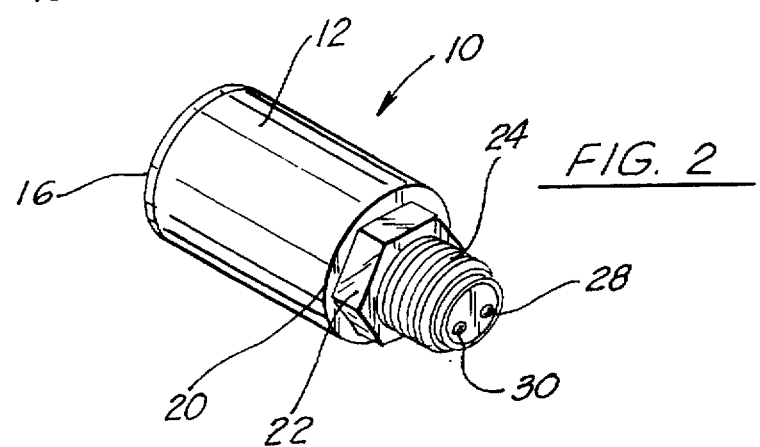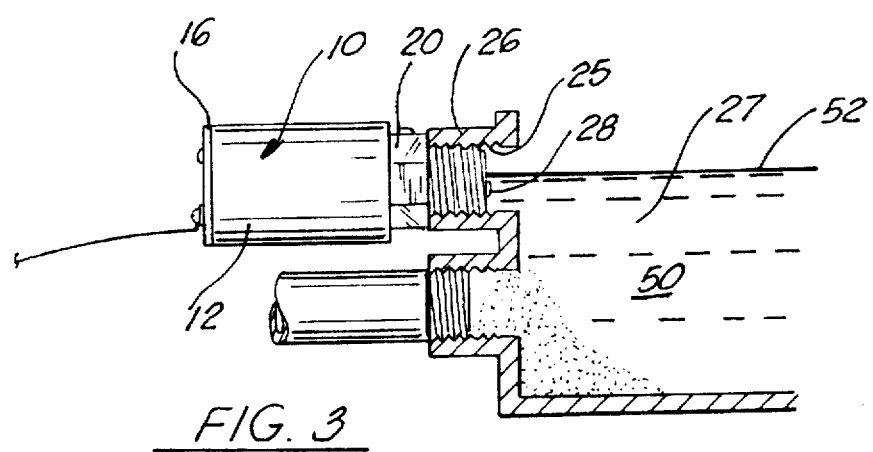

AIR CONDITIONING SYSTEM FLUID LEVEL CONTROLLER

CROSS-REFERENCE TO RELATED APPLICATIONS

Priority of U.S. Provisional patent application Ser. No. 60/011,962, filed Feb. 20, 1996, is hereby claimed. That application is hereby incorporated by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to air conditioning systems. More particularly, the present invention relates to a sensor which senses the fluid level in the fluid collection pan of an air conditioning system which, when the fluid reaches a certain level, the system is automatically shut off until it may be manually placed back into service.

2. General Background of the Invention

In central air conditioning systems, one of the most common types of systems include that the coils of the system rest within a drain pan, which should there be condensate which collects around the system due to natural condensate or to a leak in the system, the drain pan will have a first drain hole wherein the water or condensation is drained from the pan through the drain line into a hose for draining away from the system. Furthermore, there is usually provided an axiliary drain line, which is positioned slightly higher than the principal drain line for the same purposes. However, it is common in the art that the secondary drain line, because of the necessity to likewise provide a second auxiliary hose, etc., is plugged, since very rarely will that drain line be utilized since the principal drain line would normally handle the overflow. However, in the event that the principal drain line becomes clogged, and the secondary drain line is plugged, then one would run across the possibility that the fluid condensation would overflow out of the pan, and if the system is positioned in a closet or the attic or the like, water could then drain onto the floor of the attic or closet and cause water damage to the surrounding area. Therefore, there is a need in the industry for some type of a system whereby should this eventuality occur, the owner of the system would be notified in some manner.

BRIEF SUMMARY OF THE INVENTION

The apparatus of the present invention solves the shortcoming in the art in a simple and straight forward manner. What is provided is a sensor apparatus, which is threadably engaged into the auxiliary drain orifice in the drain pan. The sensor includes a pair of water contact points on a first end, which is on the threaded end of the sensor, so that should fluid or water make contact with the points, it effects a bridge across the points for creating a circuit there across. Upon this occurring, the electrical components contained within the sensor would relay a message through the thermostat wire, to the air conditioning system which would automatically shut the system down. Likewise, there is on the second end of the sensor a fluid high level indicator light, which would glow when this eventuality occurs. Therefore, when the owner would attempt to restart the system, the system would not reactivate. Therefore, upon inspection of the coils, etc., one could see that the glowing light would mean that there is a water level in the pan which is unacceptable, and therefore the water level would have to be lowered or the pan drained to a point that the water contacts on the threaded end of the sensor would not be bridged, and therefore the system could return to use.

Therefore, it is the principal object of the present invention to provide an apparatus which is engagable into the auxiliary drain port of an air conditioning pan, so that should fluid level reach a certain point, the sensor would sense that point and through the thermostat wire, interrupt power to the air conditioning system and simultaneously visually alert the owner of the system that there is a dangerously high level in the pan which level of fluid has to be reduced prior to restarting the system.

BRIEF DESCRIPTION OF THE SEVERAL VIEW OF THE DRAWINGS

For a further understanding of the nature, objects, and advantages of the present invention, reference should be had to the following detailed description, read in conjunction with the following drawings, wherein like reference numerals denote like elements and wherein:

FIG. 1 illustrates an overall view of the sensor apparatus of the present invention engaged onto a pan;

FIG. 2 is an overall view of the fluid sensor;

FIG. 3 is a side view of the fluid sensor engaged onto the auxiliary port of a drain pan;

DETAILED DESCRIPTION OF THE INVENTION

Figure 4:
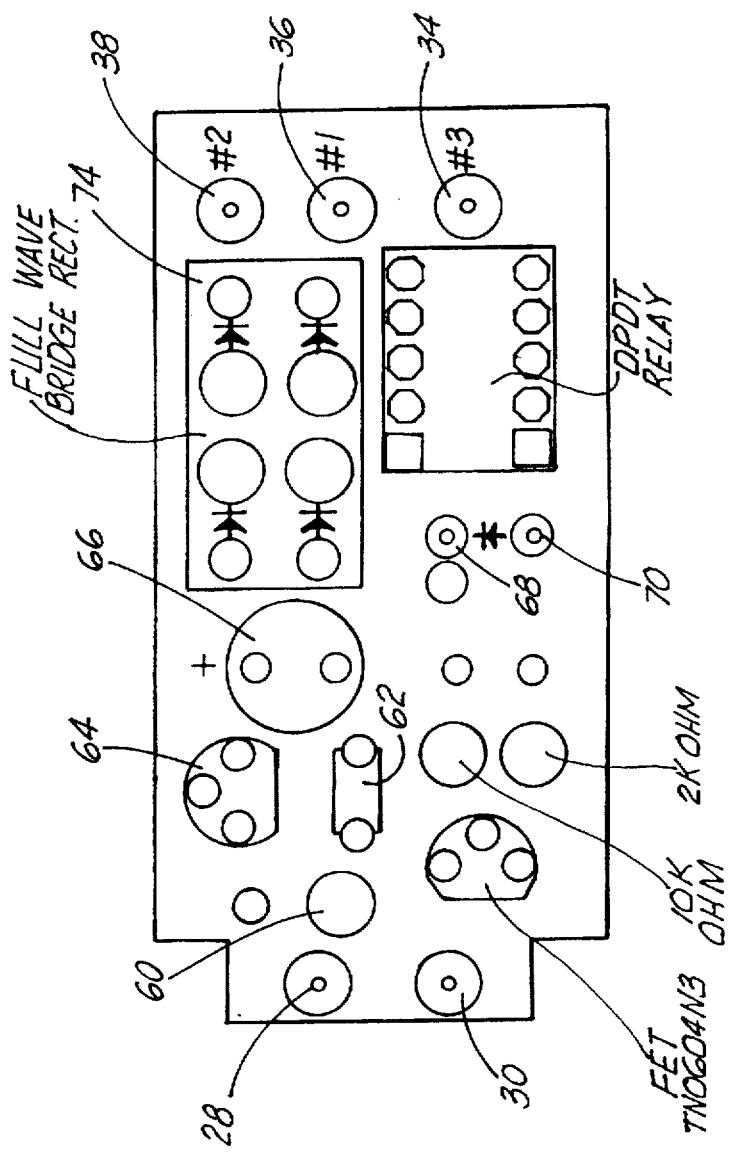
FIG. 4 is a block diagram of the electrical components of the sensor.

FIGS. 1–5 illustrate the preferred embodiment of the apparatus of the present invention by numeral 10. As illustrated in FIG. 1, apparatus 10 includes a sensor 12 which includes a cylindrical body portion 14 having a first end 16 and a second end 20. There is further included a hex nut surface 22 for threadably engaging the second end 20 of the sensor 12 onto a drain pan 27 as illustrated in FIG. 1. As seen in FIG. 2, the apparatus 10 at the second end includes a series of threads 24, which threads into the threaded port 25 of the auxiliary drain 26 of the drain pan 27 as seen in FIG. 3.

Further, the threaded second end 20, of the sensor 12, includes a pair of water contacts 28, 30, at the end 20 of the sensor, so that when the sensor is threaded into the port 25 of the pan 27, the water contacts 28, 30 are at a certain level in the pan 27 as illustrated in FIG. 3. The electrical components contained within the system 10 are illustrated both in the block diagram in FIG. 4 and the schematic in FIG. 5. Prior to a discussion of those features, reference again is made to the FIGS. 1–3 which indicate that on the first end 16 of sensor 12, there is included a series of connectors 34, 36, and 38, and the high level visual light indicator 40. The connector 34 is a thermocouple connector which engages the wire 42 from the thermocouple of the air conditioning system prior to it returning to the system itself. The other pair of connectors includes compressor contactors 36, 38 of the system. As seen in schematic and in FIG. 3, when the fluid 50 contained in the pan 27 reaches a certain level 52 as illustrated, there is a bridge formed between water contacts 28 and 30. When there is a bridge formed between water contacts 28 and 30, the power to the compressor contact 34 is interrupted, and the compressor in the system shuts down. Likewise, power to the sensors 28, 30 would light the LED indicator 40, so that an inspection of the sensor 12, would show that the LED glowing means that the water level has reached the height as indicated in FIG. 3, and therefore should be drained.

Figure 5:
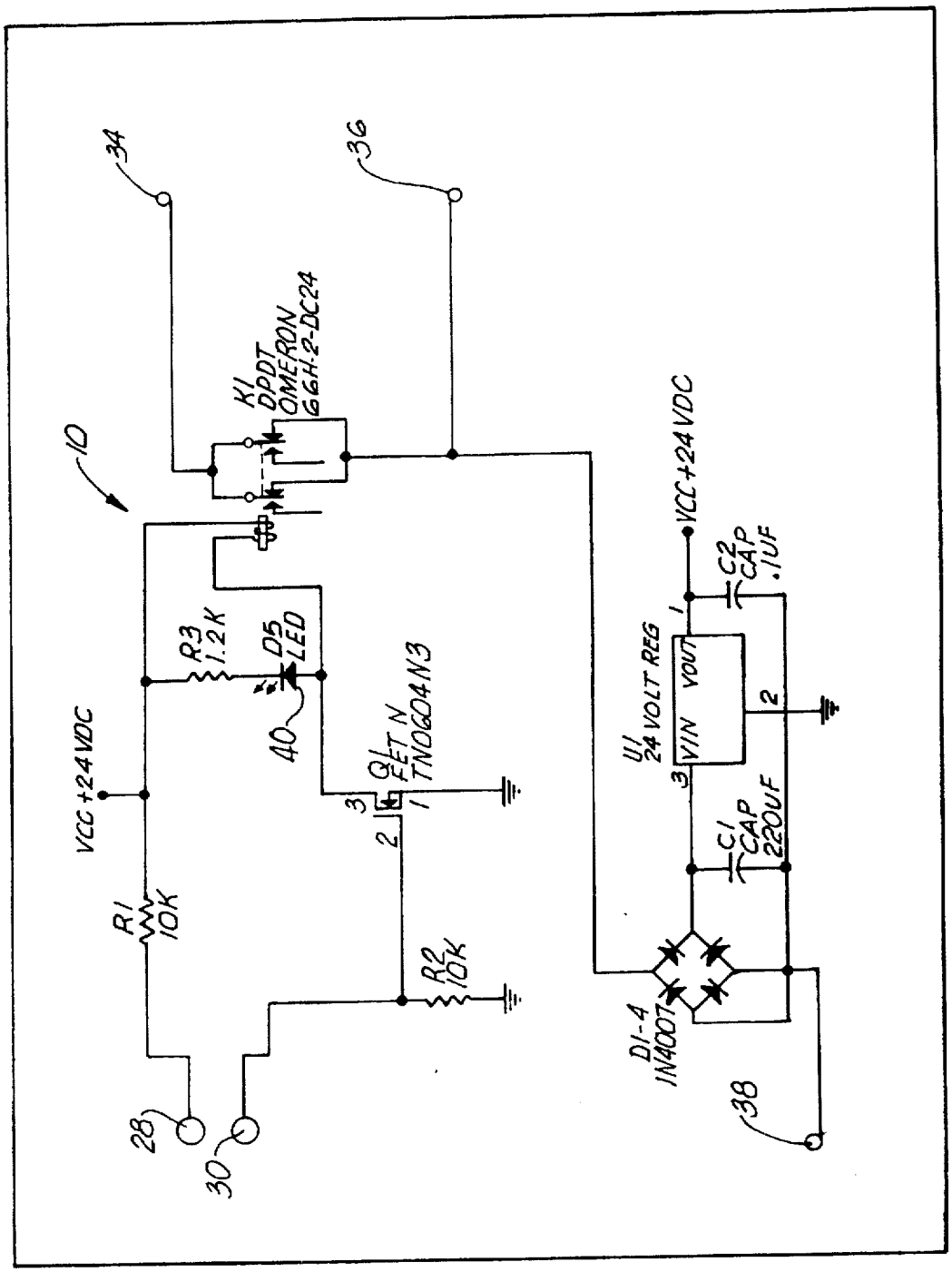
FIG. 5 is a schematic of the electrical components within the fluid sensor.

As further illustrated in the block diagram in FIG. 4, and in the schematic in FIG. 5, the electrical components include as stated earlier the water contacts or sensor inputs 28 and 30, a 10K ohm 60, a decoupling capacitor 62, a 24 volt DC regulator 64, a filter capacitor 66, LED connections 68, 70, a DPDT relay 72, and the three connections 34, 36, 38 respectively from the thermostat connection, the compressor, and the connection is the 24 VAC common. Further there is included a full wave bridge rectifier 74 in the system. This combination of components enables the sensor to work in the manner that it does, in order to automatically shut down the air conditioning system until such time that the water level is drained to the point where water contacts 28, 30 are not bridged by the fluid level.

The following table lists the part numbers and part descriptions as used herein and in the drawings attached hereto.

| PARTS LIST | |
|---|---|
| Description | Part No. |
| apparatus | 10 |
| sensor | 12 |
| body portion | 14 |
| first end | 16 |
| second end | 20 |
| hex nut surface | 22 |
| threads | 24 |
| threaded port | 25 |
| auxiliary drain | 26 |
| drain pan | 27 |
| water contacts | 28, 30 |
| connectors | 34, 36, 38 |
| LED indicator | 40 |
| wire | 42 |
| fluid | 50 |
| level | 52 |
| ohm | 60 |
| decoupling capacitor | 62 |
| regulator | 64 |
| filter capacitor | 66 |
| LED connection | 68, 70 |
| DPDT relay | 72 |
| bridge rectifier | 74 |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A sensor apparatus for sensing the water level in an air conditioning drain pan comprising:

a) a body portion;

b) a first end engaged to the drain pan;

c) the first end including a pair of water contacts;

d) a second end portion, including a series of connectors from a thermostat, a connector to a compressor, and a 24 VAC common connector, so as to receive power to the sensor in order to make the sensor operable; and e) electrical components within the sensor, so that when water contact is made with the water contacts, an electrical signal is sent through the sensor to the thermostat for shutting down the compressor system, and energizing an LED for visual inspection, until such time as the water level is drained from the pan, so that water no longer makes contact with the water contacts and power to the system is resumed.

2. The apparatus in claim 1, wherein the body portion is threadably secured to a port in a wall of the drain pan.

3. The apparatus in claim 1 further comprising a pair of water contacts on the end of the sensor engaged to the wall of the drain pan for making contact with water in the pan when the water level reaches a certain height.

4. The apparatus in claim 1, wherein the water serves as a bridge between the pair of water contacts to interrupt the operation of the compressor and to activate the LED on the sensor.

5. The apparatus in claim 1, further comprising a thermocouple connector which engages contact with the thermocouple of the air-conditioning system.

6. The apparatus in claim 1, wherein the compressor is the compressor of the air conditioning system.

7. A sensor apparatus for sensing the water level in an air conditioning drain pan comprising:

a) a body portion;

b) a first end engaged to and protruding into the drain pan;

c) the first end of the sensor including a pair of water contacts;

d) a second end portion of the sensor, including a series of connectors from a thermostat of an air-conditioning system, a connector to a compressor of the air conditioning system, and a 24 VAC common connector, so as to receive power to the sensor in order to make the sensor operable; and e) electrical components within the sensor, so that when water contact is made with the water contacts, an electrical signal is sent through the sensor to the thermostat of the air conditioning system for shutting down the compressor of the air conditioning system, and energizing an LED for visual inspection, until such time as the water level is drained from the pan, so that water no longer makes contact with the water contacts and power to the system is resumed.

8. The apparatus in claim 7, wherein the body portion is threadably secured to a port in a wall of the drain pan.

9. The apparatus in claim 7, further comprising a pair of water contacts on the end of the sensor engaged to the wall of the drain pan for making contact with water in the pan when the water level reaches a certain height.

10. The apparatus in claim 7, wherein the water serves as a bridge between the pair of water contacts to interrupt the operation of the compressor and to activate the LED on the sensor.

11. The apparatus in claim 7, further comprising a thermocouple connector which engages contact with the thermocouple of the air-conditioning system.

12. A sensor apparatus for sensing the water level in an air conditioning system of the type having a compressor, a thermostat for regulating the operation of the air conditioning system, and a drain pan for receiving excess condensation from the system, the sensor comprising:

a) a body portion;

b) a first end threadably engaged to and protruding into the drain pan;

c) the first end of the sensor including a pair of water contacts;

d) a second end portion of the sensor, including a series of connectors from the thermostat of an air-conditioning system, a connector to the compressor of the air conditioning system, and a 24 VAC common connector for providing electrical power to an LED on the sensor in order to make the sensor operable; and e) electrical components within the sensor, so that when water contact is made with the water contacts, an electrical signal is transmitted through the sensor to the thermostat of the air conditioning system for shutting down the compressor of the air conditioning system, and energizing the LED for visual inspection, until such time as the water level is drained from the pan, so that water no longer makes contact with the water contacts and power to the system is resumed.

* * * * *